(12) United States Patent
Tanaka (10) Patent No.: US 11,539,094 B2
(45) Date of Patent: Dec. 27, 2022

(54) IMAGING APPARATUS, GRIP STRUCTURE OF IMAGING APPARATUS, AND BATTERY

(71) Applicant: Panasonic Intellectual Property Management Co., Ltd., Osaka (JP)

(72) Inventor: Yutaka Tanaka, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 157 days.

(21) Appl. No.: 16/984,614

(22) Filed: Aug. 4, 2020

(65) Prior Publication Data

US 2021/0167341 A1 Jun. 3, 2021

(30) Foreign Application Priority Data

Nov. 29, 2019 (JP) .............................. JP2019-217107

(51) Int. Cl.
| | |
|---|---|
| G03B 17/02 | (2021.01) |
| G03B 17/56 | (2021.01) |
| H01M 50/213 | (2021.01) |
| H01M 50/247 | (2021.01) |
| H01M 50/296 | (2021.01) |

(52) U.S. Cl.
CPC .......... *H01M 50/213* (2021.01); *G03B 17/02* (2013.01); *G03B 17/561* (2013.01); *G03B 17/563* (2013.01); *H01M 50/247* (2021.01); *H01M 50/296* (2021.01); *G03B 2217/007* (2013.01)

(58) Field of Classification Search
CPC .... G03B 17/02; G03B 17/561; G03B 17/563; G03B 2217/007; H01M 50/107; H01M 50/207; H01M 50/213

USPC .......................................................... 396/539
See application file for complete search history.

(56) References Cited

U.S. PATENT DOCUMENTS

| | | | | |
|---|---|---|---|---|
| 5,001,505 A | * | 3/1991 | Tosaka | G03B 17/02 396/418 |
| 5,036,343 A | * | 7/1991 | Yamanaka | G03B 17/563 396/539 |
| 5,079,584 A | * | 1/1992 | Nakamura | G03B 7/26 396/539 |

(Continued)

FOREIGN PATENT DOCUMENTS

| | | |
|---|---|---|
| JP | H08-223459 A | 8/1996 |
| JP | 2009-283326 A | 12/2009 |
| JP | 2013-120198 A | 6/2013 |

OTHER PUBLICATIONS

Screen captures from YouTube video clip entitled "Canon EOS Rebel S II Battery Door Replacement," 5 pages, uploaded on Nov. 14, 2012 by user "general0ne". Retrieved from Internet: <https://www.youtube.com/watch?v=eeZsRDZzyJY>.*

(Continued)

*Primary Examiner* — Christopher E Mahoney
(74) *Attorney, Agent, or Firm* — Renner, Otto, Boisselle & Sklar, LLP (57) ABSTRACT

A grip structure connected to a main body of an imaging apparatus includes a battery storage part configured to store a battery; an inner side wall surface of the battery storage part includes a first corner, a second corner, and a third corner each having a curved shape when viewed in an insertion direction of the battery; and each of the first, second, and third corners has a radius of curvature equal to or greater than a radius of curvature of a cylindrical cell built into the battery.

6 Claims, 11 Drawing Sheets

(56) References Cited

U.S. PATENT DOCUMENTS 6,989,758 B2 * 1/2006 Kurosawa ........... H01M 50/267
396/539

OTHER PUBLICATIONS

"Rechargify Your 2CR5 Battery" 12 pages, uploaded in 2015 by user "Nano_Burger". Retrieved from Internet: https://www.instructables.com/Recharge-i-fy-your-2CR5-Battery/.*

* cited by examiner

IMAGING APPARATUS, GRIP STRUCTURE OF IMAGING APPARATUS, AND BATTERY

TECHNICAL FIELD

The present disclosure relates to an imaging apparatus to image an object, a grip structure thereof, and a battery stored in the grip structure of the imaging apparatus.

BACKGROUND

Japanese Laid-Open Patent Publication No. 2013-120198 discloses a digital camera including a main body and a grip structure connected to the main body. The grip structure of the digital camera of Japanese Laid-Open Patent Publication No. 2013-120198 is provided with an exterior cover and a battery chamber. A battery is stored in the battery chamber.

SUMMARY

The present disclosure provides a grip structure for easy hold, an imaging apparatus including the grip structure, and a battery stored in the grip structure.

A grip structure according to the present disclosure is a grip structure connected to a main body of an imaging apparatus, including a battery storage part configured to store a battery, wherein an inner side wall surface of the battery storage part includes a first corner, a second corner, and a third corner each having a curved shape when viewed in an insertion direction of the battery, and wherein each of the first, second, and third corners has a radius of curvature equal to or greater than a radius of curvature of a cylindrical cell built into the battery.

A battery according to the present disclosure is a battery stored in a grip structure of an imaging apparatus, including: two cylindrical cells both extending in an axial direction; and a cover housing the two cells arranged side by side therein, wherein an outer side wall surface of the cover includes a first corner, a second corner, and a third corner each having a curved shape when viewed in the axial direction of the cells, and wherein each of the first, second, and third corners has a radius of curvature equal to or greater than a radius of curvature of the cells.

According to the grip structure, the imaging apparatus, and the battery according to the present disclosure, easy hold can be achieved.

DETAILED DESCRIPTION

Embodiments will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art. The accompanying drawings and the following description are provided by the present inventor(s) for sufficient understanding of the present disclosure by those skilled in the art, and it is not intended to limit the subject matter described in claims thereto.

In the following description, for convenience of description, terms indicative of directions such as "upper", "lower", "front", and "rear" are used on the assumption of a normal usage state; however, this does not mean the limitation of the usage state etc. of the imaging apparatus of the present invention.

First Embodiment

In a first embodiment, a digital camera will be described as an example of an imaging apparatus according to the present disclosure.

A configuration of the digital camera according to the first embodiment will be described with reference to FIG. 1.

Figure 1:
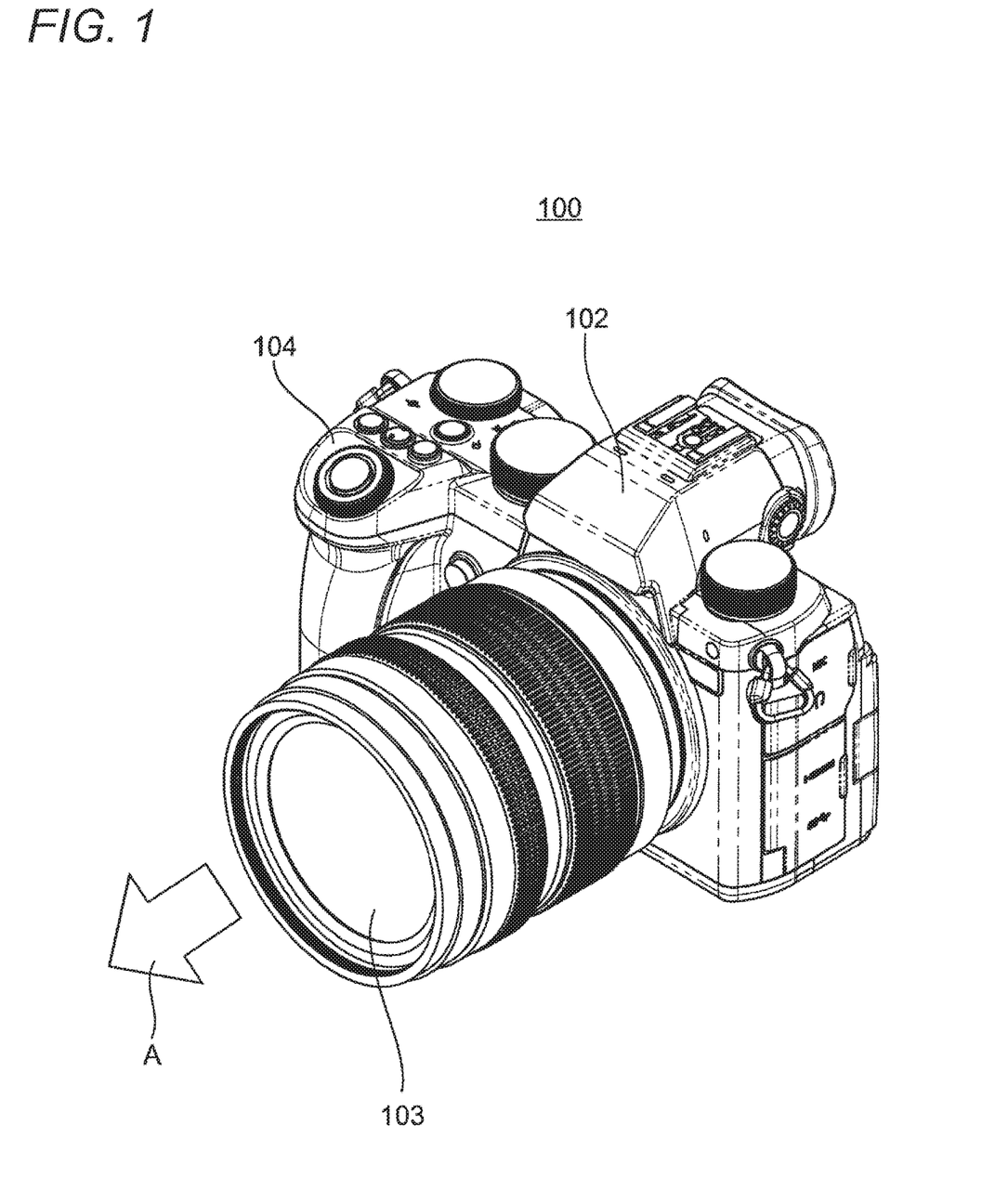
FIG. 1 is a schematic perspective view of a digital camera according to a first embodiment of the present disclosure.

FIG. 1 is a schematic perspective view of a digital camera 100 according to this embodiment. The digital camera 100 of this embodiment includes a main body 102 and a grip art 104.

The main body 102 is a main body part for imaging (referred to as "imaging main body part") of the digital camera 100. The main body 102 includes a lens 103 to image an object located on the front side in an imaging direction A via the lens 103.

The grip part 104 is a part for a user to hold the digital camera 100. The grip part 104 is connected and attached to the main body 102. In the first embodiment, the grip part 104 is integrally attached to the main body 102 and is not detachable.

A configuration of the grip part 104 will be described with reference to FIGS. 2 to 4.

Figure 2:
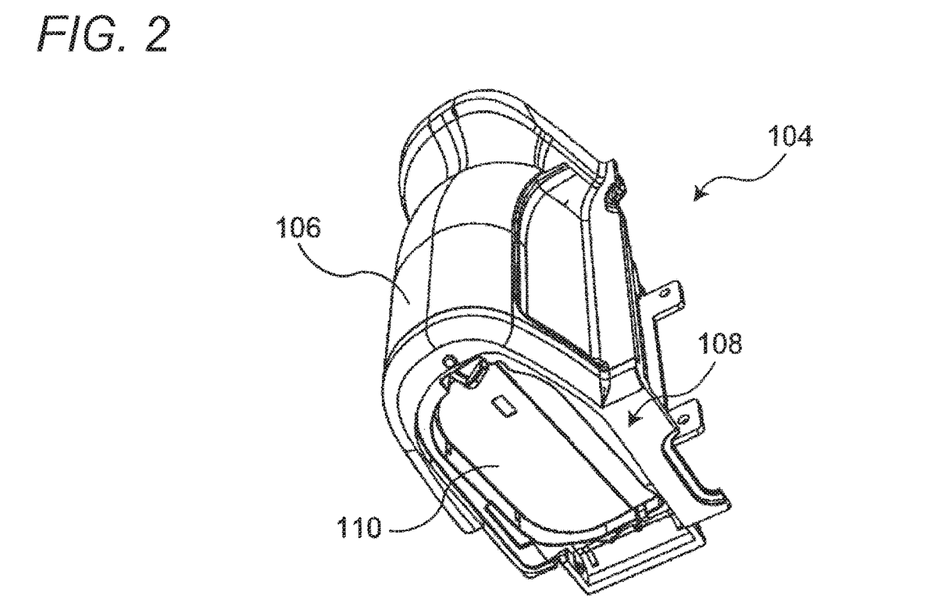
FIG. 2 is a lower perspective view of a grip part according to the first embodiment.
Figure 3:
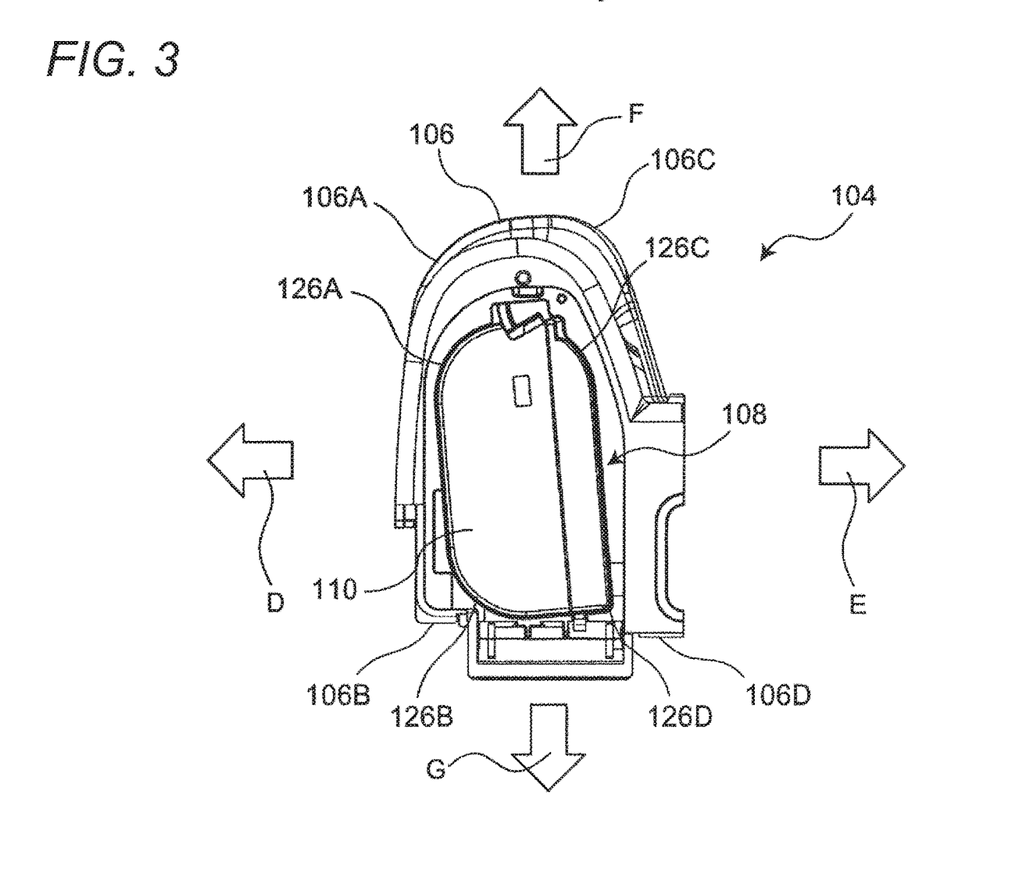
FIG. 3 is a bottom view of the grip part according to the first embodiment.

FIG. 2 is a lower perspective view of the grip part 104 and FIG. 3 is a bottom view of the grip part 104. As shown in FIGS. 2 and 3, the grip part 104 includes an exterior part 106 and a battery storage part 108.

The exterior part 106 forms a contour of the grip part 104. The exterior part 106 has a smooth curved shape corresponding to shapes of human hand and fingertips.

The battery storage part 108 is configured to store the battery 110. The battery storage part 108 according to the first embodiment is disposed on a bottom side of the grip part 104. Although not shown, the battery storage part 108 is provided with an openable/closable lid to seal the stored battery 110.

Figure 4:
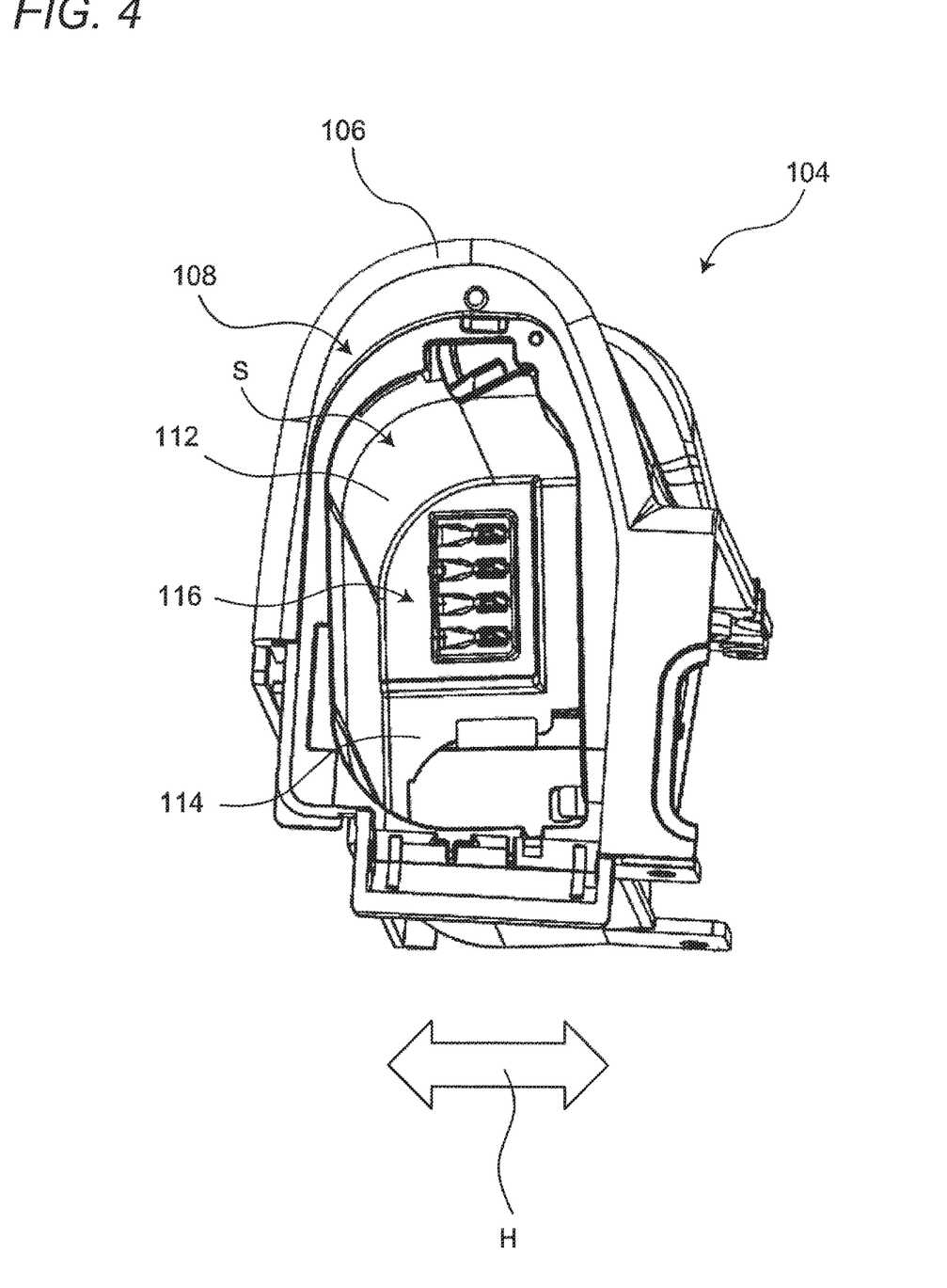
FIG. 4 is a perspective view for bottom side of the grip part when a battery is not stored according to the first embodiment.

FIG. 4 is a perspective view of the bottom side of the grip part 104 when the battery 110 is not stored. As shown in FIG. 4, the battery storage part 108 forms a battery storage space "S" for storing the battery 110. The battery storage space "S" is formed by a side wall surface 112 and a bottom wall surface 114 in the battery storage part 108.

As shown in FIG. 4, multiple camera terminals 116 are disposed on the bottom wall surface 114. The camera terminals 116 are configured to face and come into contact with battery terminals of the battery 110 described later. When the battery terminals of the battery 110 come into contact with the camera terminals 116, power can be supplied from the battery 110 to the main body 102. When the main body 102 is chargeable via a USB etc., the battery 110 can be charged from the main body 102. The camera terminals 116 consists of four terminals, which are a plus terminal, a minus terminal, a "T" terminal, and a "D" terminal.

Since the camera terminals 116 are disposed on the bottom wall surface 114 of the battery storage part 108, a dimension of the grip part 104 in a horizontal direction "H" can be made smaller than when the camera terminals are disposed on the side wall surface 112. If the camera terminals are disposed on the side wall surface 112, the camera terminals must be projected inwardly while ensuring a predetermined distance of the battery storage space "S" for storing the battery 110 in the horizontal direction "H", thereby leading to an increased dimension of the grip part 104 in the horizontal direction "H". On the other hand, since the camera terminals 116 are disposed on the bottom wall surface 114 of the battery storage part 108 in the first embodiment, the grip part 104 can be formed in an elongated shape in a vertical direction, so that the grip part 104 can be made easy to hold and also good design can be achieved.

A configuration of the battery 110 stored in the battery storage part 108 will be described with reference to FIGS. 5 to 7.

Figure 5:
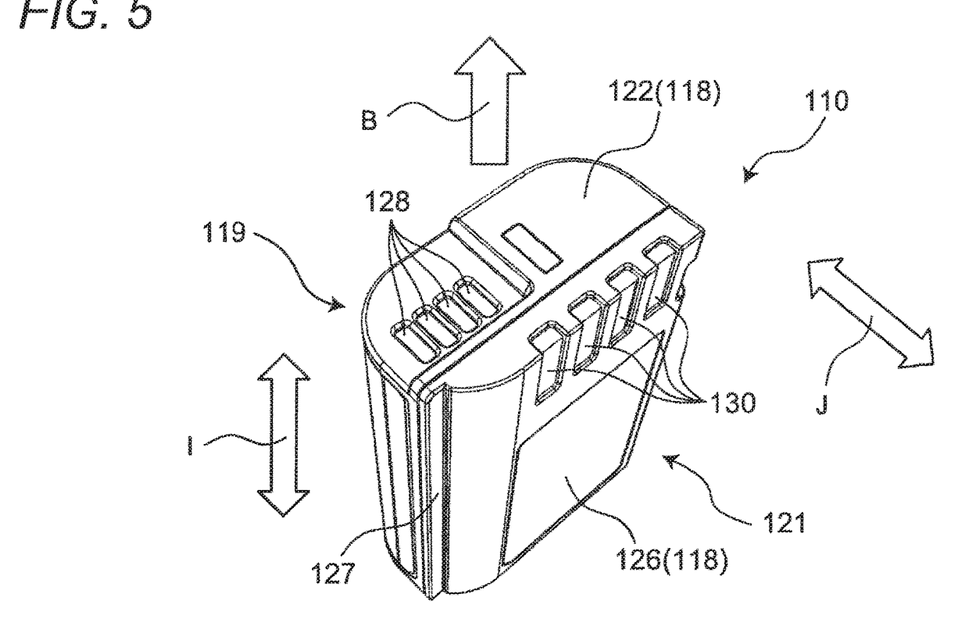
FIG. 5 is an upper perspective view of the battery according to the first embodiment.
Figure 6:
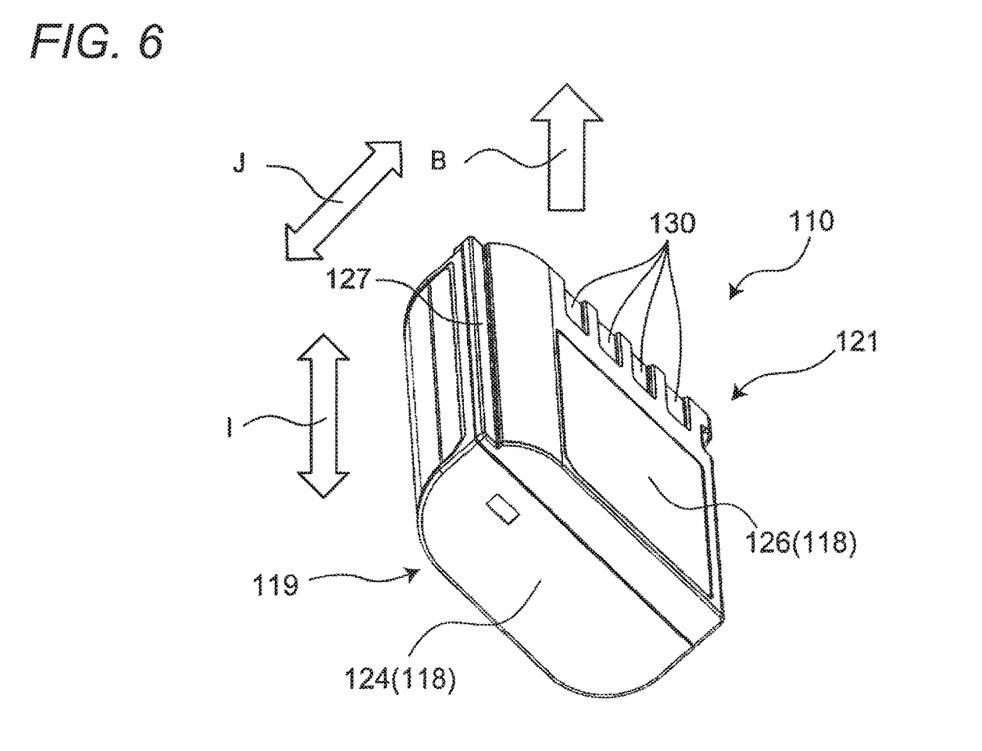
FIG. 6 is a lower perspective view of the battery according to the first embodiment.

FIGS. 5 and 6 are perspective views of the battery 110 as viewed from different angles. FIG. 7 is a plan view of the battery 110. As shown in FIGS. 5 to 7, the battery 110 includes a cover 118 forming a contour of the battery 110.

Figure 7:
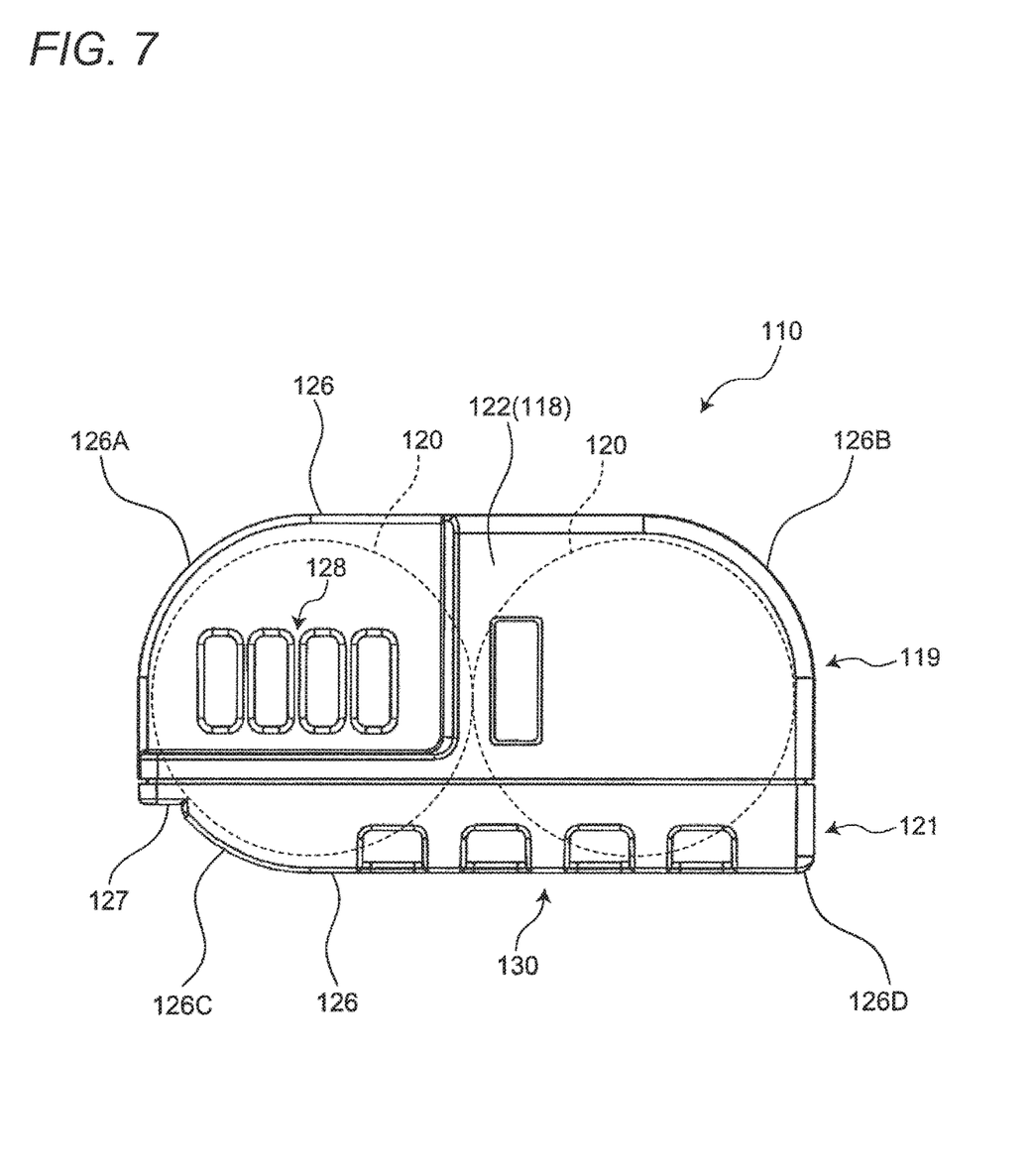
FIG. 7 is a plan view of the battery according to the first embodiment.

The cover 118 houses two cylindrical cells 120 arranged side by side therein as indicated by dotted lines in FIG. 7. Although the cells 120 housed in the cover 118 are indicated by the dotted lines in FIG. 7, the cells 120 are not shown by dotted lines in FIGS. 5 and 6.

The cover 118 has an upper wall surface 122, a lower wall surface 124, and a side wall surface 126 as outer wall surfaces exposed to outside.

The upper wall surface 122 is a surface on an insertion side of an insertion direction "B" into the battery storage part 108 described above. The lower wall surface 124 is a surface located on a side opposite to the upper wall surface 122. The side wall surface 126 is a surface connecting the upper wall surface 122 and the lower wall surface 124 to extends along the insertion direction "B". The insertion direction "B" coincides with an axial direction "I" of the cells 120, which is an extending direction of the cylindrical cells 120.

A welding flat surface part 127 is formed in a corner of the side wall surface 126. The cover 118 of the first embodiment is made by overlapping and joining two covers 119, 121 in a joining direction "J" with each other. The welding flat surface part 127 is used for the joining of the covers 119 and 121. More specifically, in a state where the first cover 119 and the second cover 121 are overlapped in the joining direction "J" with the two cylindrical cells 120 housed therein, tip of an ultrasonic horn is applied to the welding flat surface part 127 to operate the ultrasonic horn. As a result, the first cover 119 and the second cover 121 are joined to each other by ultrasonic welding.

As shown in FIG. 5, the upper wall surface 122 is provided with multiple first battery terminals 128. The first battery terminals 128 are configured to be brought into contact with the camera terminals 116 of the battery storage part 108 shown in FIG. 4 for charge/discharge of the battery 110. The first battery terminals 128 consists of four terminals, which are a plus terminal, a minus terminal, a "T" terminal, and a "D" terminal. The first battery terminals 128 can be formed by directly applying a plating treatment (e.g., gold plating) to a surface of a substrate not shown, for example.

As shown in FIGS. 5 and 6, the side wall surface 126 is provided with multiple second battery terminals 130. The second battery terminals 130 are configured to connect the battery 110 to a charger different from the digital camera 100. The second battery terminals 130 are formed in an L-shape on a corner on the upper side of the battery 110 to extend over both the upper wall surface 122 and the side wall surface 126. As with the first battery terminals 128, the second battery terminals 130 consists of four terminals, which are a plus terminal, a minus terminal, a "T" terminal, and a "D" terminal. The second battery terminals 130 can be formed by connecting a bent metal plate (e.g., a nickel plate) to a substrate not shown.

Figure 8:
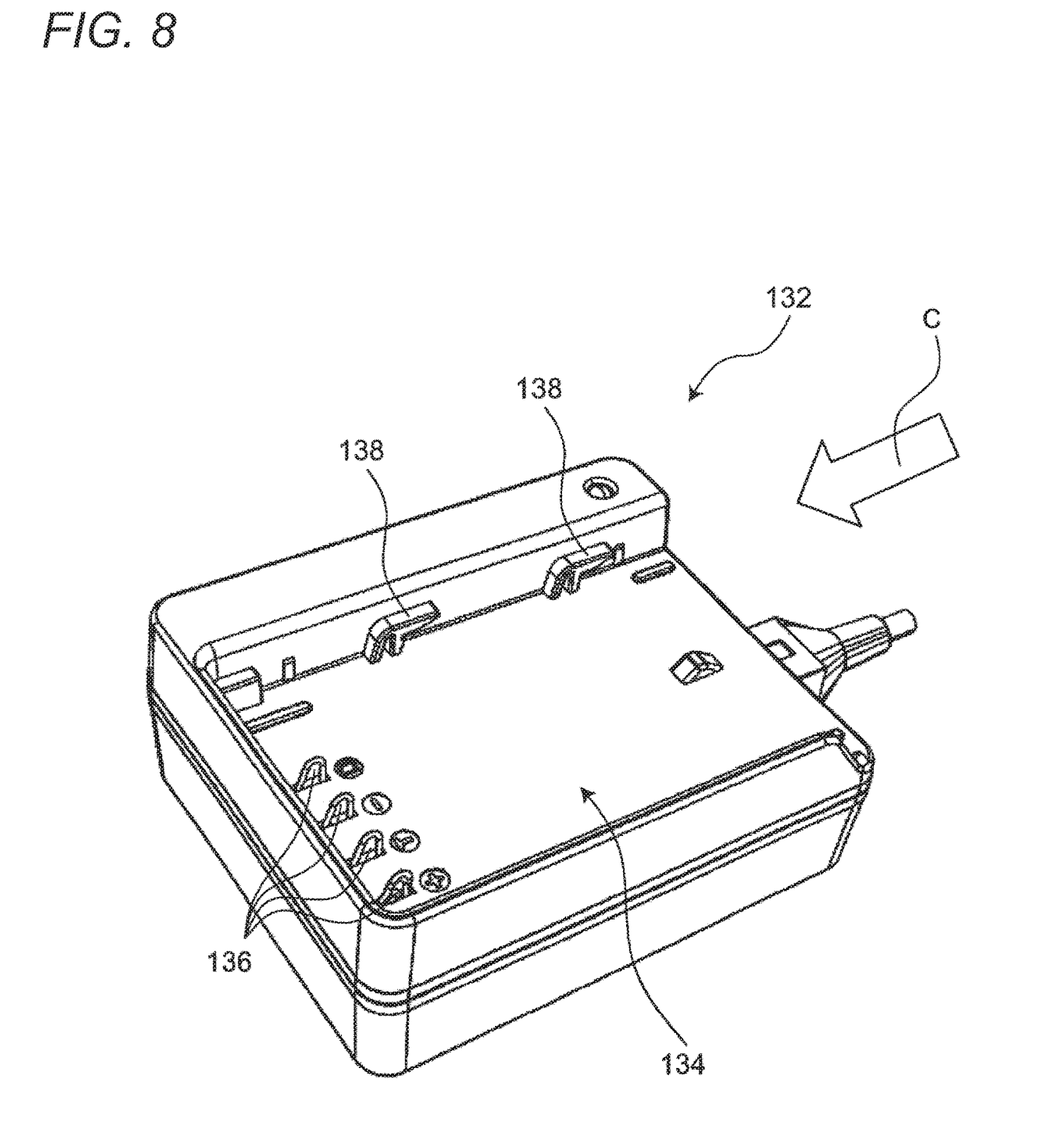
FIG. 8 is a perspective view of a charger for charging the battery.

An example of a charger for charging the battery 110 via the second battery terminals 130 is shown in FIG. 8. A charger 132 shown in FIG. 8 includes a charging part 134 for disposing the battery 110 therein. The charging part 134 forms a battery charging space for charging the battery 110, and four charging terminals 136 are disposed on a bottom surface of the charging part 134. The charging terminals 136 are configured to charge the battery 110 by coming into contact with the second battery terminals 130 of the battery 110 described above. For charging, the battery 110 is moved in a mounting direction "C" to be disposed in the battery charging space of the charging part 134, and the second battery terminals 130 are brought into contact with the charging terminals 136.

Figure 9:
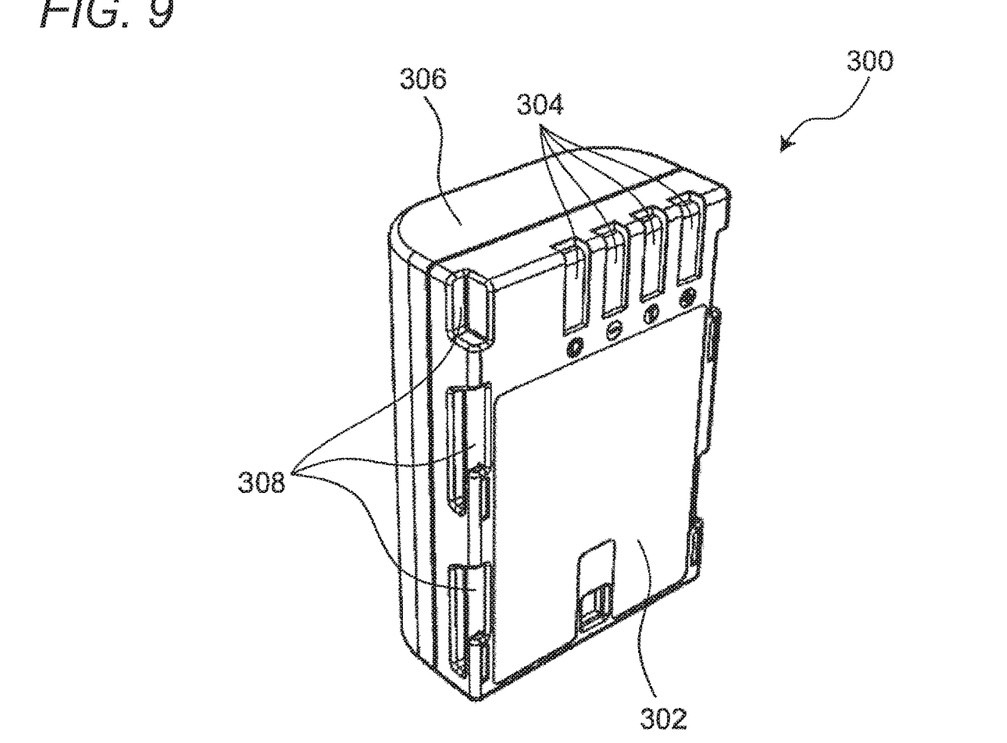
FIG. 9 is a perspective view of a conventional battery.
Figure 10:
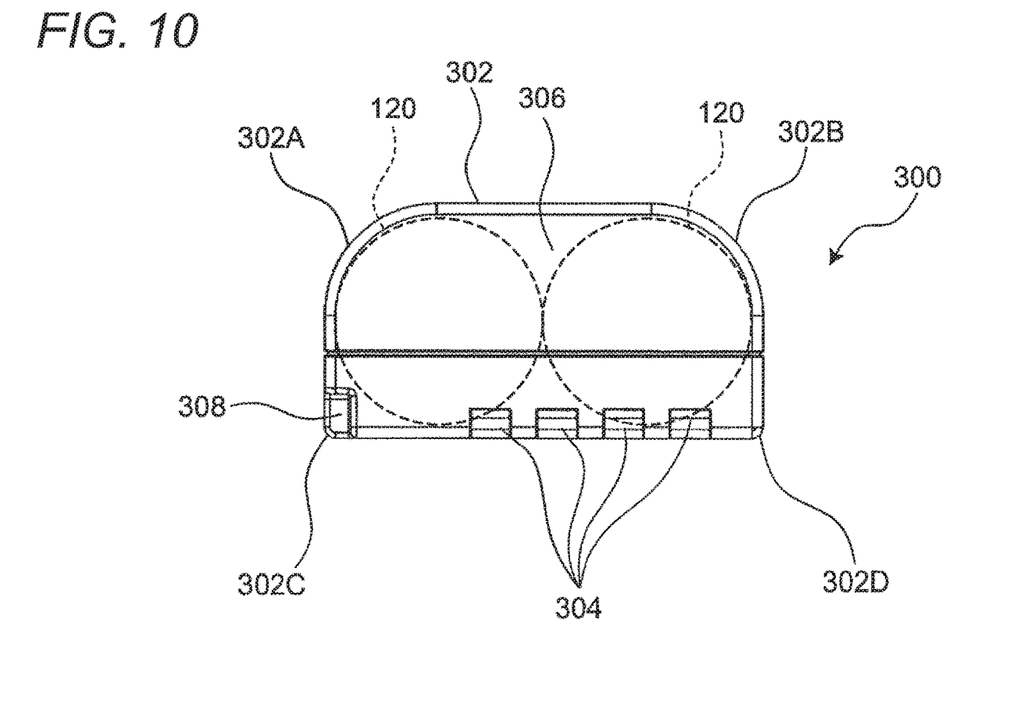
FIG. 10 is a plan view of the conventional battery.

The charger 132 shown in FIG. 8 can charge not only the battery 110 of the first embodiment, but also a conventional battery 300 as shown in FIGS. 9 and 10.

The battery 300 shown in FIGS. 9 and 10 has a different configuration and a different outer shape from the battery 110 of the first embodiment. The battery 300 has four battery terminals 304 on a side wall surface 302, whereas no terminal is disposed on an upper wall surface 306 other than the battery terminals 304. Instead, multiple notches 308 are disposed in a corner of the side wall surface 302. The multiple notches 308 are concave portions for engaging and positioning the battery 300 with the charger 132.

Returning to FIG. 8, multiple projections 138 are disposed on one side of the charging part 134 of the charger 132. When the battery 300 is moved in the charging direction relative to the charging part 134, the notches 308 of the battery 300 described above fit into the projections 138 of the charger 132 so as to position the battery 300.

On the other hand, no positioning notch is disposed in the battery 110 of the first embodiment shown in FIGS. 5 to 7. Instead of the notches, the welding flat surface part 127 is recessed inwardly relative to the side wall surface 126. Therefore, when the battery 110 shown in FIGS. 5 to 7 is moved in the charging direction C relative to the charger 132 shown in FIG. 8, the recessed welding flat surface part 127 allows the battery 110 to move to a predetermined charging position without coming into contact with the projections 138 of the charger 132.

As shown in FIGS. 5 to 7, since the battery 110 has two types of terminals, i.e., the first battery terminals 128 and the second battery terminals 130, positional change of the camera terminals 116 of the battery storage part 108 shown in FIG. 4 is allowed. More specifically, the camera terminals 116 shown in FIG. 4 may be disposed on the side wall surface 112 instead of the bottom wall surface 114 depending on a model, specifications, etc. of the digital camera 100. Even in such a case, the second battery terminals 130 of the battery 110 instead of the first battery terminal 128 may come into contact with camera terminals to enable charge/discharge of the battery 110.

As shown in FIG. 7, in a plan view of the upper wall surface 122 of the battery 110, the side wall part 126 has at least four corners, which are a first corner 126A, a second corner 126B, a third corner 126C, and a fourth corner 126D. The third corner 126C is disposed adjacent to the welding flat surface part 127 described above.

Three of the four corners 126A to 126D, i.e., the first corner 126A, the second corner 126B, and the third corner 126C, are formed in a shape along an outer circumferential surface of the cell 120. To achieve such a shape, the first corner 126A, the second corner 126B, and the third corner 126C have curved shapes with large radius of curvature. More specifically, the first corner 126A, the second corner 126B, and the third corner 126C have a radius of curvature equal to or greater than the radius of curvature of the cells 120 housed in the battery 110. As a result, the first corner 126A, the second corner 126B, and the third corner 126C have a gently curved shape in a plan view. Forming the side wall surface 126 of the cover 118 into a shape along the outer circumferential surface of the cell 120 leads to effective use of an inner space of the cover 118, reducing a size of the battery 110.

On the other hand, the fourth corner 126D is formed in a curved shape having a significantly smaller radius of curvature than those of the first corner 126A, the second corner 126B, and the third corner 126C. The curved shape of the fourth corner 126D having a significantly small radius of curvature is not intentionally formed and is naturally generated in the corner of the cover 118 in manufacturing of the cover 118.

As shown in FIG. 3, while the battery 110 is stored in the battery storage part 108, the first corner 126A and the second corner 126B are arranged on a side opposite to a connecting side for connecting the grip part 104 to the main body 102, i.e., on the outer side of the digital camera 100 (shown by arrow "D"). Or the other hand, the third corner 126C and the fourth corner 126D are arranged on the connecting side for connecting the grip part 104 to the main body 102 (shown by arrow "E"), i.e., on the inner side of the digital camera 100.

The first corner 126A and the third corner 126C are arranged on the front side of the digital camera 100, i.e., in the imaging direction A. (shown by arrow "F"). On the other hand, the second corner 126B and the fourth corner 126D are arranged on the rear side of the digital camera 100, i.e., in an opposite direction to the imaging direction A (shown by arrow "G").

In accordance with the shapes of the corners 126A to 126D of the battery 110, the exterior part 106 outside thereof has also curved shapes. As shown in FIG. 3, the first corner 126A corresponds to a first portion 106A; the second corner 126B corresponds to a second portion 106B; the third corner 126C corresponds to a third portion 106D, and the fourth corner 126D corresponds to a fourth portion 106D.

Among the portions 106A to 106D of the exterior part 106, particularly, the first portion 106A and the third portion 106C corresponding to the first corner 126A and the third corner 126C are configured to be brought into contact with fingertips of the user who is gripping the grip part 104. The second portion 106B corresponding to the second corner 126B is configured to be brought into contact with a palm of the user.

As described above, forming the three corners 126A to 126C into curved shapes having large radius of curvature in a plan view can achieve the desired shapes of the portions 106A to 106C of the exterior part 106 located outside thereof. More specifically, the first portion 106A and the third portion 106C are formed into a smooth curved shape similar to the first corner 126A and the third corner 126C. Forming such shapes of the portions 106A and 106C, which are brought into contact with the fingertips of the user gripping the grip part 104, leads to easy hold of the grip part 104 and also reduction of the size of the grip part 104.

The second portion 106B corresponding to the second corner 126B has a shape recessed inwardly toward the battery storage space 108. Forming such a shape of the portion 106B, which is brought into contact with the palm of the user gripping the grip part 104, leads to easy hold of the grip part 104 and also reduction of the size of the grip part 104.

On the other hand, the fourth portion 106D corresponding to the fourth corner 126D, which is connected to a back surface of the main body 102, has a linear shape. As a result, the back surface of the grip part 104 and the back surface of the main body 102 is continuously connected.

The battery storage part 108 of the grip part 104 has an inner shape similar to the outer shape of the battery 110 described above. Details will be described with reference to FIG. 11.

Figure 11:
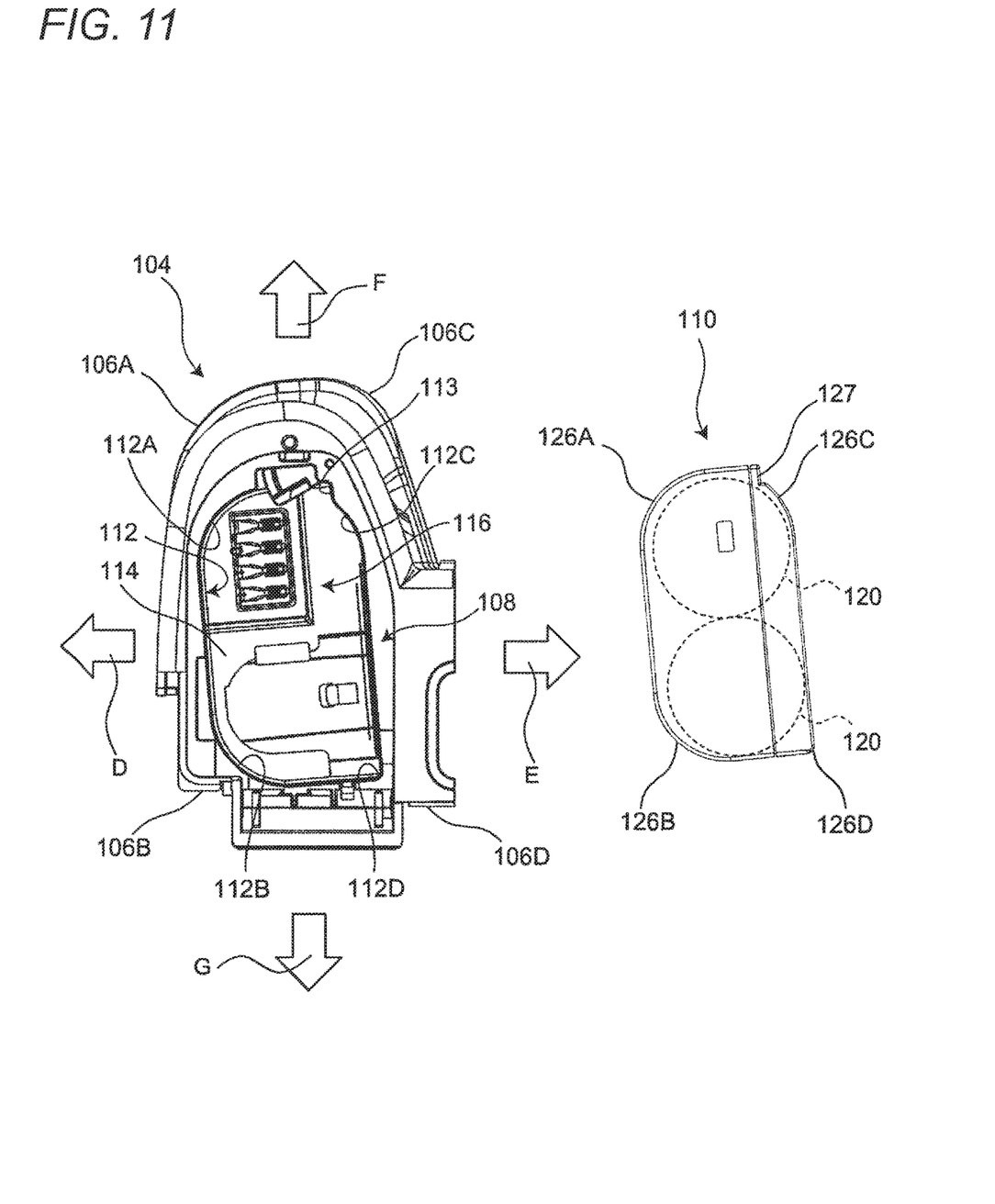
FIG. 11 is a plan view of the battery storage part and the battery arranged side by side (not stored in the battery storage part) according to the first embodiment.

FIG. 11 is a plan view of the battery storage part 108 and the battery 110 arranged side by side (not stored in the battery 110).

As shown in FIG. 11, when the battery storage part 108 is viewed in the insertion direction B of the battery 110, the side wall surface 112 has at least four corners, which are a first corner 112A, a second corner 112B, a third corner 112C, and a fourth corner 112D.

The corners 112A to 112D of the battery storage part 108 have curved shapes similar to the corners 126A to 126D of the battery 110 described above. More specifically, the first corner 112A, the second corner 112B, and the third corner 112C are formed into curved shapes having a radius of curvature equal to or greater than that of the cells 120 housed in the battery 110. On the other hand, the fourth corner 112D is formed into a curved shape having a significantly smaller radius of curvature than those of the first corner 112A, the second corner 112B, and the third corner 112C.

The first corner 112A and the second corner 112B are arranged on a side (shown by arrow "D") opposite to the connecting side for connecting the grip part 104 to the main body 102, while the third corner 1120 and the fourth corner 112D are arranged on the connect side for connecting the grip part 104 to the main body 102 (shown by arrow "E").

The first corner 112A and the third corner 112C are arranged on the front side of the digital camera 100 (shown by arrow "F"), while the second corner 112B and the fourth corner 112D are arranged on the rear side of the digital camera 100 (shown by arrow "G").

A flat surface part 113 corresponding to the welding flat surface part 121 of the battery 110 described above is disposed adjacent to the third corner 112C.

In accordance with the shapes of the corners 112A to 112D of the side wall surface 112 of the battery storage part 108, the portions 106A to 106D of the exterior part 106 outside thereof are also formed into curved shapes. The portions 106A to 106D of the exterior part 106 have the desired shapes as described above, achieving easy hold of the grip part 104 and also a reduced size of the grip part 104.

As shown in FIG. 11, the shapes of the side wall surface 126 of the battery 110 and the exterior part 106 of the grip part 104 in a plan view are made along the outer circumferential surfaces of the cells 120 built into the battery 110. As a result, the battery 110 can be reduced in size and the grip part 104 can be made easy to hold while ensuring the maximum size of the cells 120 built into the battery 110. Ensuring the maximum size of the cells 120 achieves large capacity for the maximum number of photographed images, which is based on the size of the cells 120.

In the conventional battery 300 as shown in FIG. 10, the side wall surface 302 has four corners 302A to 302D when viewed in the insertion direction, and only the first corner 302A and the second corner 302B have a curved shape with a large radius of curvature. As compared to when only the two corners 302A, 302B have a curved shape with a large radius of curvature as described above, the battery 110 of the first embodiment has the three corners 126A to 126C having curved shapes with large radius of curvature, and therefore, the outer shape of the battery 110 can be reduced in size. As the battery 110 is reduced in size, the battery storage part 108 and the exterior part 106 located outside the battery storage part 108 can also be reduced in size, thereby achieving a wide range of its shape variations (for example, curved shape, recessed shape, etc.).

As described above, the grip part 104 of the first embodiment has a grip structure connected to the main body 102 of the digital camera 100 as an imaging apparatus, having the battery storage part 108 configured to store the battery 110. When viewed in the insertion direction B of the battery 110, the side wall surface 112 in the battery storage p 108 has the first corner 112A, the second corner 112B, and the third corner 112C having curved shapes. Each of the first, second, and third corners 112A to 112C has a radius of curvature equal to or greater than the radius of curvature of the cylindrical cells 120 built into the battery 110.

According to the grip part 104, forming the at least three corners 112A to 112C of the side wall surface 112 of the battery storage part 108 into curved shapes with the radii of curvature thereof having a predetermined value or more can achieve the round shapes of the three corners 112A to 112C along the cylindrical shapes of the cells 120. As a result, the exterior part 106 of the grip part 104 located outside the battery storage part 108 can accordingly be formed into a smooth shape, thereby achieving easy hold of the part 104 and further leading to size reduction of the digital camera 100.

According to the grip part 104 of the first embodiment, the first corner 112A and the second corner 112B are arranged on the side opposite to the connecting side to the main body 102, and the third corner 112C is arranged on the connecting side to the main body 102.

With this configuration, arranging the first corner 112A and the second corner 112B on the side opposite to the connecting side to the main body 102 can achieve large smooth shapes of the portions 106A, 106B corresponding to the first corner 112A and the second corner 112B in the exterior part 106 of the grip part 104. Thus, the two corners of the portions 106A, 106B, which are touched by hand of the user holding the digital camera 100, can be formed into large smooth shapes, thereby achieving easier hold of the digital camera 100.

According to the grip part 104 of the first embodiment, the side wall surface 112 of the battery storage part 108 further has the fourth corner 112D arranged on the connecting side to the main body 102.

With this configuration, various shapes of the battery storage part 108 can be achieved by forming the fourth corner 112D into a different shape from the shapes of the other corners, etc.

According to the grip part 104 of the first embodiment, the fourth corner 112D has a curved shape when viewed in the insertion direction "B" of the battery 110, and the radius of curvature thereof is smaller than the radius of curvature of the cells 120 built into the battery 110.

With this configuration, the fourth corner 112D, i.e., the corner connected to the main body 102, can be shaped as desired.

According to the grip part 104 of the first embodiment, the third corner 112C is located on the front side in the imaging direction "A" of the digital camera 100, and the fourth corner 112D is located on the rear side in the imaging direction "A" of the digital camera 100.

According to this configuration, since the third corner 112C is located on the front side in the imaging direction "A", a smooth shape of the third corner 112C touched by fingertips of the user holding the digital camera 100 can be achieved, thereby achieving easier hold of the digital camera 100. Additionally, since the fourth corner 112D is located on the rear side in the imaging direction "A", the connecting portion to the main body 102 not contributing to the holding of the digital camera 100 can be shaped as desired while ensuring the large battery storage space "S" of the battery storage part 108.

According to the grip part 104 of the first embodiment, the bottom wall surface 114 of the battery storage part 108 is provided thereon with the camera terminals 116 to face the first battery terminals 128 of the battery 110.

With this configuration, the side wall surface 112 of the battery storage part 108 does not need camera terminals thereon, thereby reducing the dimension of the battery storage part 108 in the horizontal direction "H". As a result, the digital camera 100 becomes easier to hold.

The digital camera 100 as the imaging apparatus described above includes the grip part 104 as a grip structure and the main body 102 connected to the grip part 104. With this configuration, the same effect as the grip part 104 described above can be achieved.

The battery 110 described above includes the two cylindrical cells 120 extending in the axial direction "I" and the cover 118 housing the two cells 120 arranged side by side therein. The outer side wall surface 126 of the cover 118 includes the first corner 126A, the second corner 126B, and the third corner 126C each having curved shape when viewed along the axial direction "I" of the cells 120. Each of the first, second, and third corners 126A to 126C has a radius of curvature equal to or greater than the radius of curvature of the cells 120.

With this configuration, the same effect as the grip part 104 described above can be achieved.

According to the battery 110 of the first embodiment, the cover 118 further includes the upper wall surface 122 provided on the insertion side into the battery storage part 108 of the grip part 104. The battery 110 further includes the first battery terminals 128 disposed on the upper wall surface 122 of the cover 118 and the second battery terminals 130 disposed on the side wall surface 126 of the cover 118.

This configuration is adaptable to both cases of the camera terminals 116 located on the lateral side and the bottom side.

Second Embodiment

A grip part 204 of a second embodiment according to the present invention will be described with reference to FIGS. 12 to 14. Below, differences between the second embodiment and the first embodiment will mainly be described. The same or equivalent constituent elements are denoted by the same reference numerals and its explanation will be omitted.

While the grip part 104 in the first embodiment is integrally attached to the main body part 102, the second embodiment is different from the first embodiment in that the grip part 204 is a so-called "battery grip" (in other words "vertical grip") attachable to and detachable from the main body 102.

Figure 12:
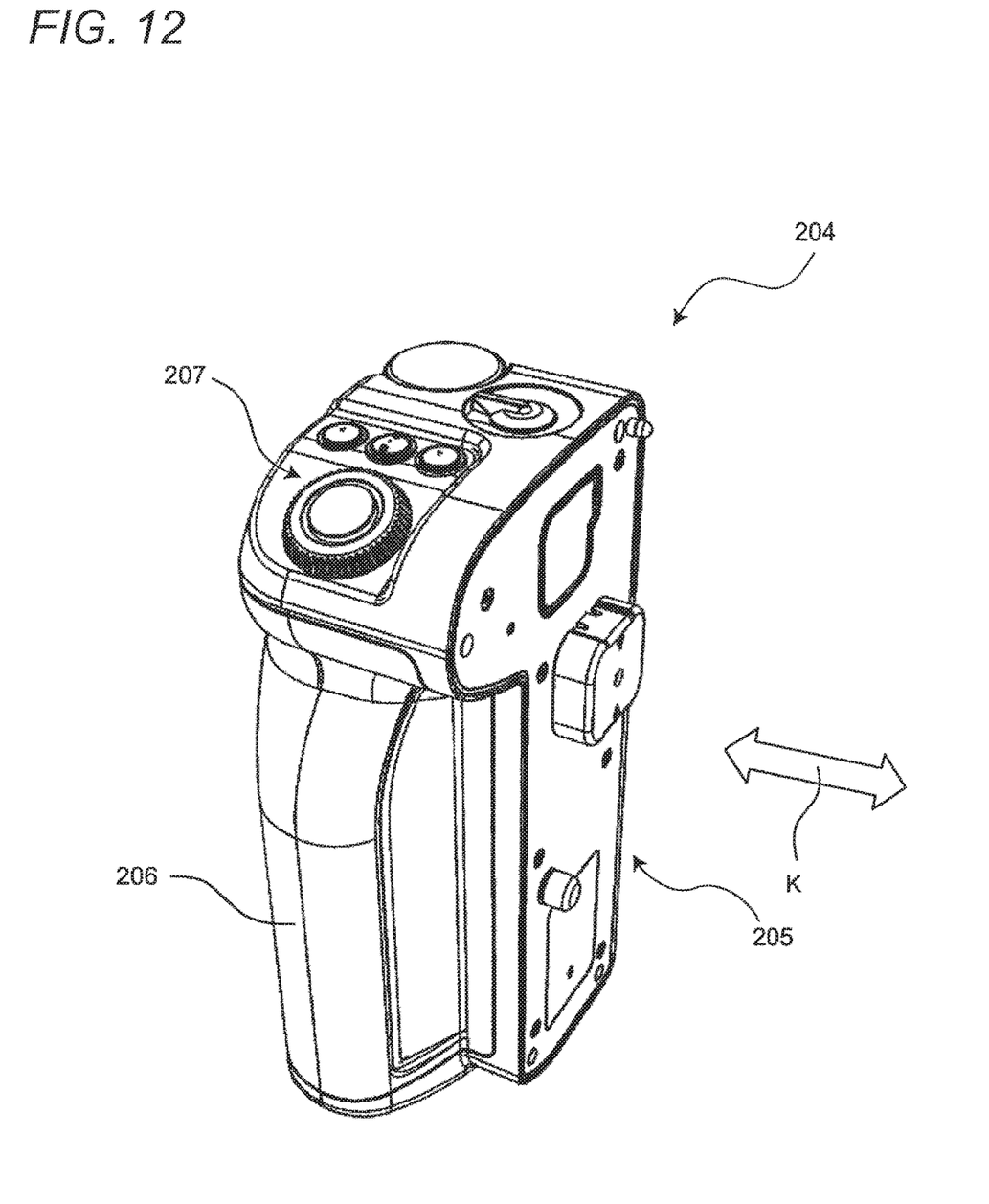
FIG. 12 is a perspective view of a grip part according to a second embodiment.

FIG. 12 is a perspective view showing the grip part. 204 of the second embodiment. As shown in FIG. 12, the grip part 204 includes an attaching/detaching part 205, an exterior part 206, and a switch part 207.

The attaching/detaching part 205 has a shape for attaching/detaching the grip part 204 to/from the main body (not shown) in an attachment/detachment direction "K". The attaching/detaching part 205 is attached to and detached from a bottom surface of the main body, for example.

The exterior part 206 forms a contour of the grip part 204. The exterior part 206 has a smooth curved shape corresponding to shapes of human hand and fingertips.

The switch part 207 includes various switches such as a release button.

When the attaching/detaching part 205 is attached to the bottom surface of the main body, the grip part 204 and the main body can communicate with each other, and user operation for the switch part 207 of the grip part 204 allows a corresponding signal to be transmitted to the main body. As a result, an imaging operation etc. are performed in the main body.

The same battery 110 as in the first embodiment can be used for the grip part 204 shown in FIG. 12. FIG. 13 shows a plan view of the grip part 204 with the battery 110 being stored therein. Similarly, FIG. 14 shows a plan view of the grip part 204 and the battery 110 arranged side by side (not stored in the grip part 204).

Figure 13:
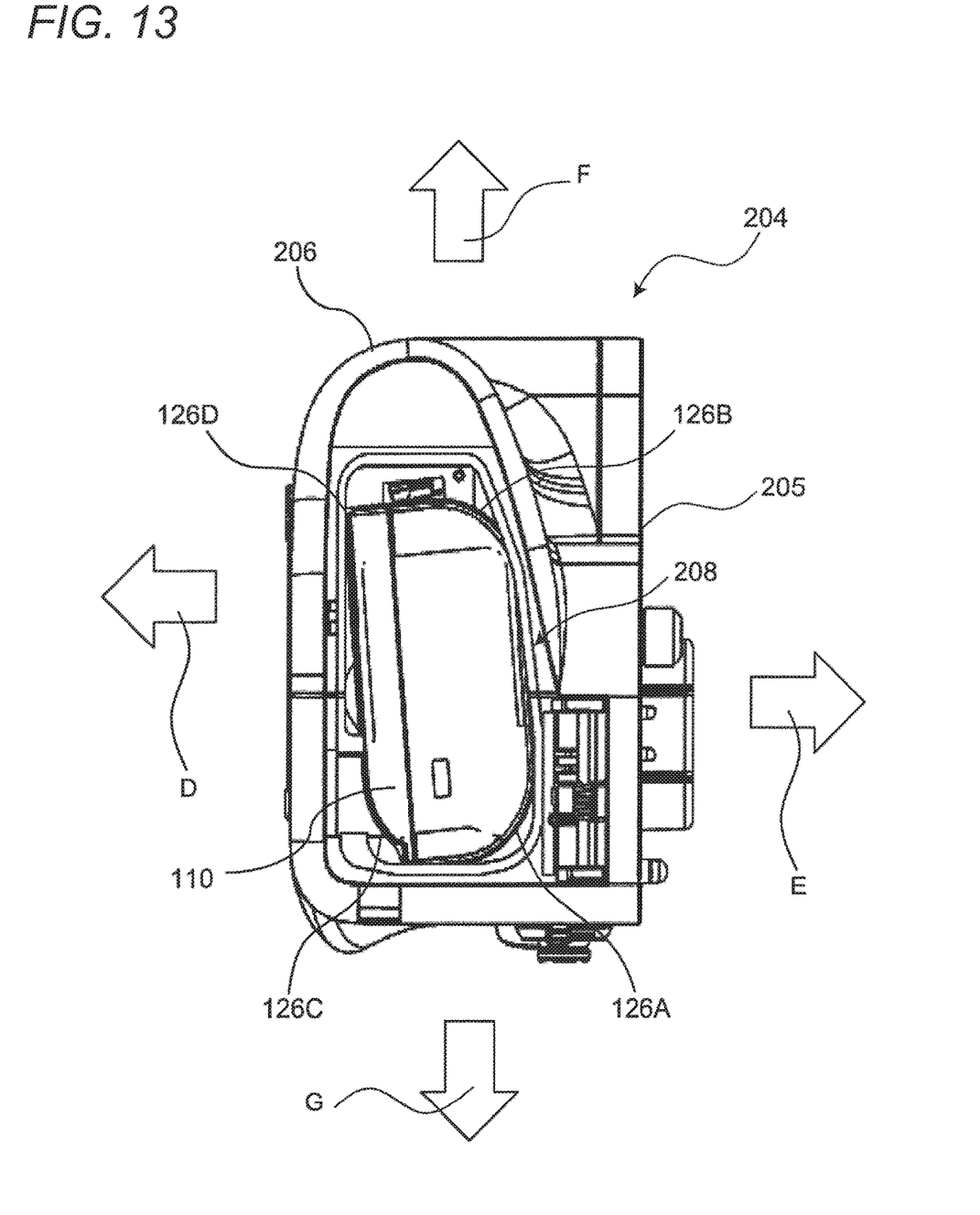
FIG. 13 is a plan view of the grip part when a battery is stored according to the second embodiment.
Figure 14:
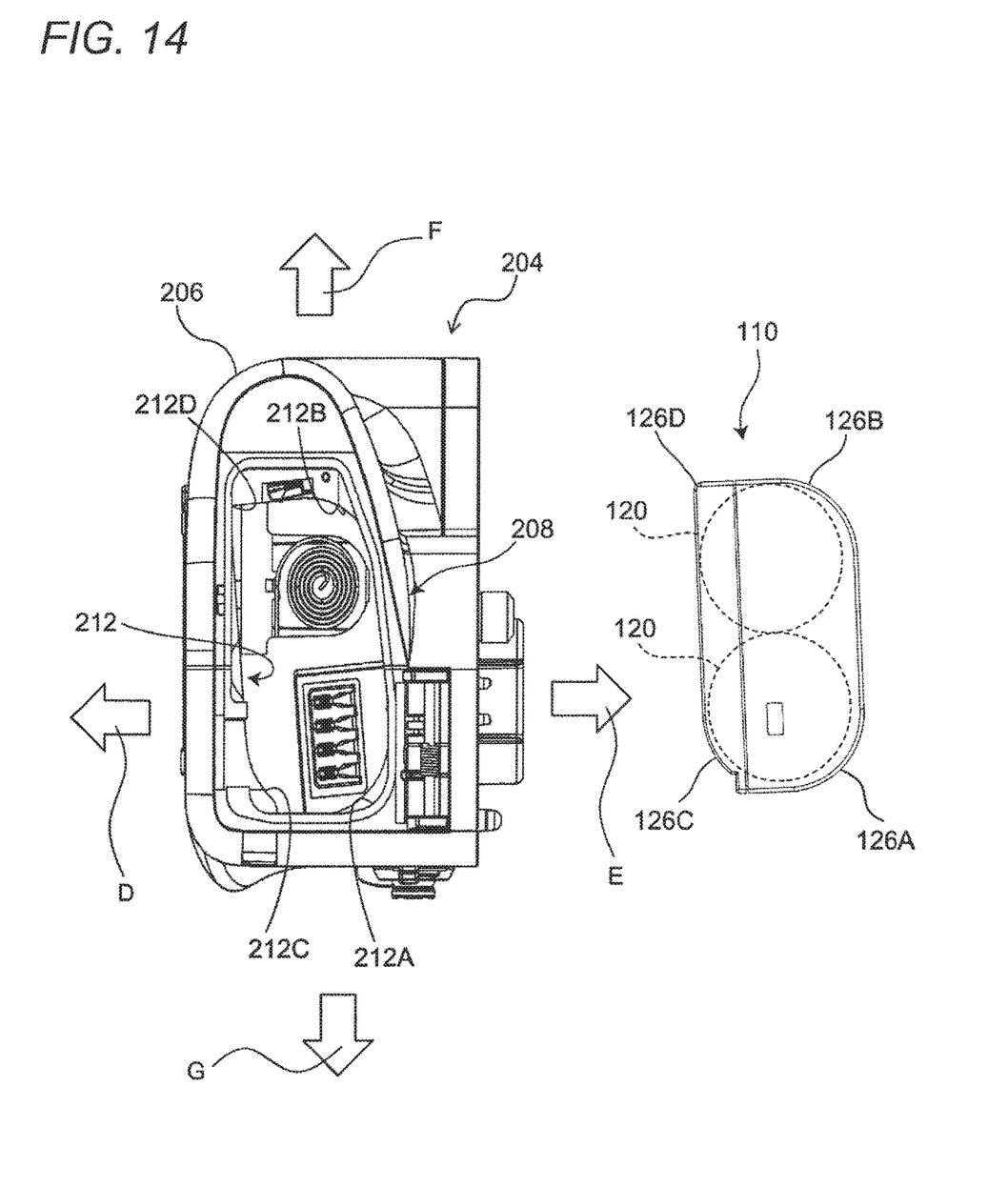
FIG. 14 is a plan view of the grip part and the battery arranged side by side (not stored in the grip part) according to the second embodiment.

As shown in FIGS. 13 and 14, a battery storage part 208 for storing the battery 110 is formed in a bottom surface of the grip part 204.

As described in the first embodiment, the battery 110 has the four corners 126A to 126D. As shown in FIG. 13, the battery 110 is stored in the battery storage part 208 of the second embodiment in an orientation different from the first embodiment. More specifically, the first corner 126A and the second corner 126B are arranged on the connecting side for the grip part 104 to the main body 102 (shown by arrow "E"), i.e., on the inner side of the digital camera 100. On the other hand, the third corner 126C and the fourth corner 126D are arranged on the side (shown by arrow "D") opposite to the connecting side, i.e., on the outer side of the digital camera 100.

The first corner 126A and the third corner 126C are arranged on the rear side of the digital camera 100, i.e., in the opposite direction (shown by arrow "G") to the imaging direction "A". On the other hand, the second corner 126B and the fourth corner 126D are arranged on the front side of the digital camera 100, i.e., on the same direction (shown by arrow F) as the imaging direction "A".

The battery storage part 208 of the grip part 204 has a similar shape in accordance with the outer shape of the battery 110. More specifically, as shown in FIG. 14, when the battery storage part 208 is viewed in the insertion direction "B" of the battery 110, a side wall surface 212 has at least four corners, which are a first corner 212A, a second corner 212B, a third corner 212C, and a fourth corner 212D.

In the battery storage part 208 described above, each of the first corner 212A, the second corner 212B, and the third corner 212C of the side wall surface 212 has a radius of curvature equal to or greater than the radius of curvature of the cylindrical cells 120 built into the battery 110. As a result, various shapes of the exterior part 206 of the grip part 204 located outside the battery storage part 208 can be achieved, and the grip part 204 can be formed into a desired shape easy to hold.

Other Embodiments

As described above, the first embodiment has been described as exemplification of the techniques disclosed in this application. However, techniques in the present disclosure are not limited thereto and are also applicable to embodiments in which modifications, replacements, additions, omissions, etc. are appropriately made. Additionally, the constituent elements described in the first embodiment can be combined to provide a new embodiment.

In the description of the second embodiment, the orientation of the battery 110 in the battery storage part 208 is opposite to that of the first embodiment; however, the present invention is not limited thereto. The battery storage part 208 may surround battery 110 in the same orientation as the first embodiment, and also the exterior part 206 may have a different shape depending on the orientation. Such a modification can achieve the similar effect to the first embodiment.

In the first and second embodiments described above, the digital camera is described as an example of the imaging apparatus; however, the present invention is not limited thereto. The imaging apparatus of the present disclosure may be an electronic device (e.g., a video camera) with imaging function.

The embodiments have been described as exemplification of the techniques in the present disclosure. The accompanying drawings and the detailed description have been provided for this purpose.

Therefore, the constituent elements described in the accompanying drawings and the detailed description may include not only the constituent elements essential for solving the problem but also constituent elements not essential for solving the problem so as to illustrate the techniques. Thus, even though these non-essential constituent elements are included in the accompanying drawings and the detailed description, these non-essential constituent elements should not immediately be recognized as being essential.

Since the embodiments described above are intended to illustrate the techniques in the present disclosure, various modifications, replacements, additions, omissions, etc. can be made within the claims and the scope equivalent thereto.

The present disclosure is applicable to an imaging apparatus imaging an object, a grip structure thereof, and a battery stored in the grip structure of the imaging apparatus.

What is claimed is:

1. A grip structure of an imaging apparatus connected to a main body of the imaging apparatus, comprising:
    a battery storage part configured to store only one battery, wherein
    an inner side wall surface of the battery storage part includes a first corner, a second corner, and a third corner each having a curved shape when viewed in an insertion direction of the battery, and wherein each of the first, second, and third corners has a radius of curvature which conforms to a radius of curvature of a cylindrical cell built into the battery,
    wherein the first corner and the second corner are arranged on a side opposite to a connecting side to the main body, and wherein the third corner is arranged on the connecting side to the main body,
    the side wall surface of the battery storage part further includes a fourth corner arranged on the connecting side to the main body, and
    the fourth corner has a curved shape when viewed in the insertion direction of the battery and has a radius of curvature smaller than the radius of curvature of the cell built into the battery.

2. The grip structure according to claim 1, wherein the third corner is located on a front side in an imaging direction of the imaging apparatus, and wherein the fourth corner is located on a rear side in the imaging direction of the imaging apparatus.

3. The grip structure according to claim 1, wherein a bottom wall surface of the battery storage part is provided thereon with a first camera terminal to face a terminal of the battery.

4. An imaging apparatus comprising:
    the grip structure according to claim 1; and
    the main body connected to the grip structure.

5. A grip structure of an imaging apparatus connected to a main body of the imaging apparatus, comprising:
    a battery storage part configured to store only one battery, wherein
    an inner side wall surface of the battery storage part includes a first corner, a second corner, and a third corner each having a curved shape when viewed in an insertion direction of the battery, and wherein each of the first, second, and third corners has a radius of curvature which conforms to a radius of curvature of a cylindrical cell built into the battery,
    wherein the first corner and the second corner are arranged on a side opposite to a connecting side to the main body, and wherein the third corner is arranged on the connecting side to the main body,
    the side wall surface of the battery storage part further includes a fourth corner arranged on the connecting side to the main body, and
    the fourth corner has a curved shape when viewed in the insertion direction of the battery, and wherein the curved shape of the fourth corner does not conform to the radius of curvature of the cell built into the battery.

6. A grip structure of an imaging apparatus connected to a main body of the imaging apparatus, comprising:
    a battery storage part configured to store a battery, wherein
    an inner side wall surface of the battery storage part includes a first corner, a second corner, a third corner and a fourth corner each having a curved shape when viewed in an insertion direction of the battery, and wherein each of the first, second, and third corners has a radius of curvature which conforms to a radius of curvature of a cylindrical cell built into the battery, and wherein the fourth corner has a radius of curvature which does not conform to the radius of curvature of the cylindrical cell built into the battery.

* * * * *